United States Patent [19]

Endo et al.

[11] Patent Number: 5,024,885

[45] Date of Patent: Jun. 18, 1991

[54] MAGNETIC RECORDING MEDIUM

[75] Inventors: Yasushi Endo; Mikihiko Kato; Toshio Kawamata; Kouichi Masaki, all of Kanagawa, Japan

[73] Assignee: Fuji Photo Film Co., Ltd., Kanagawa, Japan

[21] Appl. No.: 252,076

[22] Filed: Sep. 30, 1988

[30] Foreign Application Priority Data

Sep. 30, 1987 [JP] Japan ................................. 62-244141

[51] Int. Cl.$^5$ .............................................. G11B 23/00
[52] U.S. Cl. .................................. 428/329; 428/423.9; 428/694; 428/900
[58] Field of Search ............. 428/329, 694, 900, 425.9

[56] References Cited

U.S. PATENT DOCUMENTS

| | | | |
|---|---|---|---|
| 4,455,345 | 6/1984 | Miyatuka et al. | 428/900 |
| 4,539,129 | 9/1985 | Nagai et al. | 252/62 |
| 4,548,801 | 10/1985 | Nagai et al. | 423/594 |
| 4,565,726 | 1/1986 | Oguchi et al. | 428/900 |
| 4,600,521 | 7/1986 | Nakamura et al. | 428/694 |
| 4,613,545 | 9/1986 | Chubachi et al. | 428/694 |
| 4,666,770 | 5/1987 | Asai et al. | 428/323 |
| 4,714,654 | 12/1987 | Ito et al. | 428/694 |
| 4,743,501 | 5/1988 | Eguchi et al. | 428/329 |
| 4,778,734 | 10/1988 | Ohdan et al. | 428/694 |
| 4,784,914 | 11/1988 | Matsufuji et al. | 428/329 |
| 4,801,505 | 1/1989 | Ejiri et al. | 428/403 |
| 4,830,923 | 5/1989 | Sumiya et al. | 428/425.9 |

FOREIGN PATENT DOCUMENTS 141558A  5/1985  European Pat. Off. .

*Primary Examiner*—Paul J. Thibodeau
*Attorney, Agent, or Firm*—Sughrue, Mion, Zinn, Macpeak & Seas

[57] ABSTRACT

A magnetic recording medium is described, comprising a nonmagnetic support having thereon a magnetic layer containing ferromagnetic particles which are a hexagonal system tabular particle, and which have an axis of easy magnetization in a direction of perpendicular to the major axis of the plate and are dispersed in a binder, wherein said ferromagnetic particles have a saturation magnetization of 60 emu/g or higher, a specific surface area (BET method) of from 25 to 70 m$^2$/g, an average particle diameter of from 0.01 to 0.2 μm, and a coercive force of from 400 to 2000 oersteds, and said biner contains a resin having at least one kind of polar group in an amount of $1 \times 10^{-5}$ eq/g or more of the polar group.

7 Claims, No Drawings

MAGNETIC RECORDING MEDIUM

FIELD OF THE INVENTION

This invention relates to a magnetic recording medium, more particularly, it relates to a magnetic recording medium using ferromagnetic particles which are hexagonal system tabular particles and have an axis of easy magnetization in a direction of perpendicular to the plate surface.

BACKGROUND OF THE INVENTION

A magnetic recording medium comprising a non-magnetic support having thereon a magnetic layer containing ferromagnetic particles composed of acicular crystals such as $\gamma$-$Fe_2O_3$, $CrO_2$ and Co—$Fe_2O_3$ dispersed in a binder has been widely used for magnetic recording and reproduction.

Recently, higher density recording has been strongly demanded for high volume recording and for minimizing the size of recording devices. In order to prepare a magnetic recording medium using conventional acicular magnetic particles which is suitable for higher density recording, it is necessary that the maximum dimension of the acicular magnetic particles be smaller than the recording wavelength or recording bit length. At present, acicular magnetic particles having a dimension of about 0.3 $\mu$m have been realized and the shortest recording wavelength of about 1 $\mu$m has been obtained.

In order to obtain a medium which can provide much higher density recording, it is necessary to further reduce the dimension of acicular magnetic particles. Such small acicular magnetic particles have a very thin thickness (100Å or lower) and a very low particle volume ($10^{17}$ cm$^3$ or lower). Accordingly, problems that magnetic characteristics are decreased due to heat disturbance an effect on the surface (i.e., the effect in that the magnetic characteristics in surface portions of a magnetic medium are reduced because the spin of atoms which is present at the vicinity of the surface of the magnetic medium becomes unstable), and orientation cannot fully be conducted even if a magnetic layer is charged in the magnetic field.

To avoid the above defects, a magnetic recording medium using ferromagnetic particles of hexagonal system ferrite which is a tabular particle and has an axis of easy magnetization in a direction of perpendicular to the plate surface has recently been developed, as described in JP-A-58-6525 and JP-A-58-6526. The term "JP-A" as used herein means an unexamined published Japanese patent application. In accordance with the above medium, the average particle size of the ferromagnetic particles is 0.05 $\mu$m or lower and higher density recording is possible.

Further, it is proposed that hexagonal system ferrite particles having a saturation magnetization of 30 emu/g or higher and a specific surface area of from 70 to 120 m$^2$/g be used to reduce noise and to increase S/N, as disclosed in JP-A-62-38531.

In a magnetic recording medium using hexagonal system ferrite magnetic particles, reproduction output and C/N can be improved by increasing a saturation magnetization, but, as ferromagnetic particles having a high specific surface area are used, dispersion is insufficient and it is difficult to simultaneously improve the running durability of a magnetic layer.

SUMMARY OF THE INVENTION

An object of this invention is to provide a magnetic recording medium using hexagonal system tabular ferromagnetic particles which have improved reproduction output, high C/N and also improved running durability.

The above object can be achieved by a magnetic recording medium comprising a non-magnetic support having thereon a magnetic layer containing ferromagnetic particles which are a hexagonal system tabular particle, and which have an axis of easy magnetization in a direction of perpendicular to the plate surface (i.e., the major axis of the plate) and are dispersed in a binder, wherein the ferromagnetic particles have a saturation magnetization 60 emu/g or higher, a specific surface area determined by the BET method of from 25 to 70 m$^2$/g, an average particle diameter of from 0.01 to 0.2 $\mu$m, and a coercive force of from 400 to 2000 oersteds, the binder contains a resin having at least one kind of polar group in an amount of $1 \times 10^{-5}$ eq/g or more of the polar group. That is, in this invention, output and durability are simultaneously improved by simultaneously greatly increasing a saturation magnetization and by using a polar group containing binder.

DETAILED DESCRIPTION OF THE INVENTION

This invention will hereinafter be illustrated in more detail.

Non-magnetic supports for use in this invention are not particularly limited, and ones generally used can be used. Examples of materials for forming a non-magnetic support include various synthetic resin films of polyethylene terephthalate, polyethylene, polypropylene, polycarbonate, polyethylene naphthalate, polyamide, polyamidoimide, polyimide, polysulphone or polyether polysulphone, and metal foils such as an aluminum foil or a stainless steel foil. The non-magnetic support generally has a thickness of from 2.5 to 100 $\mu$m, preferably from 3 to 80 $\mu$m.

Ferromagnetic particles which are a hexagonal system tabular particle and have an axis of easy magnetization in a direction perpendicular to the plate surface (i.e., the major axis of the plate) include, for example, hexagonal system ferrite particles such as substitutes of barium ferrite, strontium ferrite, lead ferrite and calcium ferrite, and among these, Co-substituted barium ferrite and Co-substituted strontium ferrite are particularly preferred. The above substituents are represented by the following formula; $AO \cdot n(Fe_{1-m} \cdot M_m)_2O_3$ wherein A represents at least one atom selected from the group consisting of Ba, Sr, Ca, and Pb; M represents at least one atom selected from the group consisting of Co, Ti, Zn, Ni, Mn, In, Cu, Ge, and Nb; m represents from 0 to 0.2; and n represents from 5.4 to 6.0.

The hexagonal system tabular particle which can be used in the present invention can be prepared according to Kiyama.M., *Bull. Chem Soc. Japan*, 49, 1855 (1976), and H. Hibst, *Angew. Chem. Int. Ed. Engl.*, 21, 270–282 (1982).

Hexagonal system tabular ferromagnetic particles generally have an average tabular diameter (average particle diameter) of from about 0.1 to 0.20 $\mu$m, and an average tabular thickness (average particle thickness) of from about 0.001 to 0.5 $\mu$m, and, in this invention, an average tabular diameter (average particle diameter) of from about 0.03 to 0.10 $\mu$m, and an average tabular thickness (average particle thickness) of from about 0.003 to 0.05 μm are particularly preferred.

The saturation magnetization is 60 emu/g or higher and preferably from 60 to 80 emu/g. If it is lower than 60 emu/g, sufficient reproduction output cannot be obtained, and such a medium is not suitable for high density recording.

The specific surface area measured by the BET method is from 25 to 70 (m²/g) and preferably from 25 to 50 m²/g. If it is lower than 25 m²/g, sufficiently high C/N can not be obtained, while if it is higher than 70 m²/g, a saturation magnetization decreases and sufficient output can not be obtained. The coercive force is from 400 to 2000 oersteds, and preferably from 500 to 1500 oersteds.

"VSM-P1" (manufactured by Toei Kogyo Co., Ltd.) was used to measure a saturation magnetization and external magnetization was 10 K (Oe). "Quantersorb" (manufactured by Quanterchrom Co., Ltd.) was used for measuring the specific surface area. The specific surface area was measured by the BET one-point method partial pressure: 0.30) after dehydration in an $N_2$ atmosphere at 250° C. for 30 minutes as described in Byck, H. T., Fidiam, J. F., A. Spell, Paper, No. 49, Div. of Colloid Chem., Am. Chem., Soc. Meating, Chicago I-11 (Sept. 12, 1946).

The binders for use in this invention are resins containing a polar group, such as polyurethane resins having, for example, a —COOR' or —SO₃R' group (R' represents an hydrogen atom or an alkali metal such as sodium or potassium), vinyl chloride type resins having a —SO₃R' group, a —COOR' group, a —OSO₃R' group or

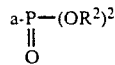

group (R' has the same definition as above and R² is a hydrogen atom, an alkali metal or a hydrocarbon group), and a polyester resins having a —SO₃R' group (R' has the same definition as above).

The above resins are disclosed in JP-A-59-8127, JP-A-59-92422, JP-A-92423, JP-A-59-8127, and JP-A-59-40320.

Specific examples of the polar group containing resins include a —COOH group containing polyurethane ("TIM-3005", manufactured by SANYO CHEMICAL INDUSTRIES, LTD.), an —SO₃Na containing a polyurethane "UR-8300" manufactured by TOYOBO CO., LTD-, a —COOH group containing copolymer of vinyl chloride and vinyl acetate "400×110A" manufactured by Nippon Zeon Co., Ltd., a —SO₃Na containing polyester "Vylon 530" manufactured by TOYOBO CO., LTD., and a —SO₃Na containing copolymer of vinyl chloride and vinyl acetate "MR-110" manufactured by Nippon Zeon Co., Ltd. Among these, the —COOH group containing copolymer of vinyl chloride and vinyl acetate and the —SO₃Na containing copolymer of vinyl chloride and vinyl acetate are particularly preferred. The content of the polar group or groups is generally $1 \times 10^{-5}$ or more, preferably from $1 \times 10^{-5}$ eq/g to $1 \times 10^{-3}$ eq/g, and more preferably from $1 \times 10^{-5}$ to $1 \times 10^{-4}$ eq/g The molecular weight is preferably from 10,000 to 200,000 and more preferably from 30,000 to 100,000.

These resins can be alone or in combination, and can be used with binders commonly used for a magnetic recording medium such as thermoplastic resins, thermosetting resins or reactive type resins as described in U.S. Pat. Nos. 4,152,485, 4,529,661, 4,707,410, 4,613,545 and 4,707,411. In this case, it is preferable that the above described polar group containing resins be present in an amount of 5 wt % or higher, and more preferably from 15 to 30 wt %.

Upon preparing a magnetic recording medium using hexagonal system tabular ferrite type ferromagnetic particles, if the above polar group containing resins are used as a binder, the dispersibility thereof can be greatly improved, and a "perpendicular" magnetic recording medium having greatly improved reproduction output and S/N can be obtained.

The mixing ratio of the ferromagnetic particles to the binder(s) in this invention is generally from 10 to 50 parts by weight, preferably from 15 to 30 parts by weight, of binders per 100 parts by weight of the ferromagnetic particles.

The magnetic layer of this invention may include conventional additives such as abrasive agents, antistatic agents, dispersing agents or lubricating agents in addition to the above described ferromagnetic particles and binders.

Abrasive agents for use in this invention include those commonly used, such as fused alumina, silicon carbide, chromium oxide ($Cr_2O_3$), corundum, artificial corundum, diamond, artificial diamond, garnet, or emery (main components: corundum and magnetite). The abrasive agents have a Mohs' hardness of 5 or higher and an average particle diameter of generally from 0.05 to 5 μm and preferably from 0.4 to 0.8 μm. The abrasive agents are added in an amount of generally from 3 to 20 parts by weight and preferably from 7 to 15 parts by weight, per 100 parts by weight of the binder(s).

If the additive amount thereof is lower than 3 parts by weight, sufficient durability cannot be obtained, while if it is higher than 20 parts by weight, packing density is decreased, and, therefore, sufficient output cannot be obtained.

Antistatic agents include electroconductive fine particles such as carbon black, or carbon black graft polymers; natural surface active agents such as saponin; nonionic surface active agents such as alkylene oxide type agents, glycerine type agents or glycidol type agents; cationic surface active agents such as higher alkylamines, quaternary ammonium salts, pyridine and other heterocyclic compounds, phosphonium or sulphoniums; anionic surface active agents such as carboxylic acids, sulfonic acids, phosphoric acids, and agents having an acid group such as a sulfate group or a phosphate group; or amphoteric surface active agents such as amino acids, aminosulfonic acids or sulfate or phosphates of aminoalcohol.

The above described electroconductive particles are used in an amount of generally from 0.2 to 20 parts by weight and preferably from 1 to 8 parts by weight, per 100 parts by weight of the binder, and the surface active agents are used in an amount of generally from 0.1 to 10 parts by weight and preferably from 0.5 to 10 parts by weight, per 100 parts by weight of the binder(s).

The surface active agents may be added alone or as a mixture. The surface active agents are used as an antistatic agent, and in some cases, may be used for improving dispersing and magnetic characteristics and lubricating properties or as a coating aid.

The dispersing agents (pigment wetting agents) for use in this invention include fatty acids ($R_1COOH$, $R_1$ represents an alkyl or alkenyl group having from 11 to 17 carbon atoms) having from 12 to 18 carbon atoms (e.g., caprylic acid, capric acid, lauric acid, myristic acid, palmitic acid, stearic acid, oleic acid, elaidic acid, linolic acid, linolenic acid, stearolic acid); metal soaps composed of an alkali metal (e..g, Li, Na, K) or an alkaline earth metal (e.g., Mg, Ca, Ba), salt of the above fatty acids; compounds containing a fluorine into the above fatty acid esters; amides of the above fatty acids; polyalkylene oxide alkylphosphates; lecithin; and trialkyl polyolefin oxyquaternary ammonium salts (where the alkyl has from 1 to 5 carbon atoms and olefins are ethylene or propylene). In addition to the above, higher alcohols having from 12 to 20 carbon atoms and sulfates can also be used. The dispersing agents are added in an amount of generally from 0.5 to 20 parts by weight and preferably from 1 to 7 parts by weight, per 100 parts by weight of binders.

The lubricating agents include silicon oil such as dialkylpolysiloxane (where alkyl has from 1 to 5 carbon atoms), dialkoxypolysiloxane (where alkoxy has from 1 to 4 carbon atoms), monoalkyl monoalkoxypolysiloxane (where alkyl has from 1 to 5 carbon atoms and alkoxy group has from 1 to 4 carbon atoms), phenylpolysiloxane, fluoroalkylpolysiloxane (where alkyl has from 1 to 5 carbon atoms); electroconductive particles such as graphite; inorganic particles such as molybdenum disulfide or tungsten disulfide; particles of a polymer such as polyethylene, polypropylene, copolymers of polyethylene and vinyl chloride or polytetrafluoroethylene; $\alpha$-olefin polymers; unsaturated aliphatic hydrocarbons which are liquid at a normal temperature (compounds bonded with n-olefin double bond at the terminal carbon; number of carbon atoms: about 20); fatty acid esters composed of a monobasic fatty acid having from 12 to 20 carbon atoms and a monohydric alcohol having from 3 to 12 carbon atoms and fluorocarbons. Those lubricating agents are added in an amount of generally from 0.2 to 20 parts by weight and preferably from 5 to 15 parts by weight, per 100 parts by weight of the binder(s).

The magnetic recording medium of this invention can be prepared by mixing, kneading and dispersing the above described ferromagnetic particles, binders and, if desired, various additives with an organic solvent, coating the resulting magnetic coating composition on a support, providing magnetic orientation and then drying.

The organic solvents for use in this invention upon dispersing, mixing, kneading and coating include ketones (e.g., acetone, methyl ethyl ketone, methyl isobutyl ketone, cyclohexanone, isophoron, tetrahydrofuran), alcohols (e.g., methanol, ethanol, propanol, butanol, isobutyl alcohol, isopropyl alcohol, methyl cyclohexanol), esters (e.g., methyl acetate, ethyl acetate, butyl acetate, isobutyl acetate, isopropyl acetate, ethyl lactate, glycol acetate, monoethyl ether), glycol ethers (e.g., ether, glycol dimethyl ether, glycol monoethyl ether, dioxane), tars i.e., aromatic hydrocarbons (e.g., benzene, toluene, xylene, cresol, chlorobenzene, styrene), chlorinated hydrocarbons (e.g., methylene chloride, ethylene chloride, carbon tetrachloride, chloroform, ethylene chlorohydrin, dichlorobenzene), N,N-dimethyl formaldehyde and hexane.

Upon mixing and kneading, the magnetic particles and the above described each component(s) is/are added simultaneously or one by one into a conventional mixing and kneading machine. For example, magnetic particles are added into a solvent containing dispersing agents and mixed and kneaded for a predetermined period of time to obtain a magnetic coating composition.

Upon mixing, kneading and dispersing the magnetic coating composition, various conventional mixing and kneading machines can be used, such as a two-roll mill, a three-roll mill, a ball mill, a pebble mill, a trommel, a sand grinder, a Szebvari attritor, a high speed impeller dispersing machine, a high speed stone mill, a high speed impact mill, a disperser, a kneader, a high speed mixer, a homogenizer or an ultrasonic dispersing machine.

At least two magnetic layers may be provided by a simultaneous multi-coating method, as disclosed in "Flow of paint and pigment dispersion" by T. C. Patten (1975).

The magnetic layer has a dry thickness of generally from about 0.5 to 12 $\mu$m and preferably from 2 to 4 $\mu$m. When the magnetic layer is a multi-layer, the total dry thickness should be within the above range. The dry thickness is determined by contemplated uses, shapes and standards of the magnetic recording medium.

The magnetic layer thus provided on a support is provided, if desired, with magnetic orientation to orient the magnetic particles contained in the magnetic layer and then dried. If desired, the magnetic layer is then surface treated to smooth the surface and cut to a desired shape to prepare a magnetic recording medium of this invention.

When a magnetic layer was surface smoothed in this invention, it was found that a magnetic recording medium having good surface smoothness and excellent wear resistance was obtained. Surface smoothing treatments include smoothing before the magnetic layer is dried, and calendering treatment after the magnetic layer is dried.

The above method for preparting or treating the magnetic layer is described in JP-B-40-23625, JP-B-39-28368, and U.S. Pat. No. 3,473,960 (the term "JP-B" as used herein means an "examined Japanese patent publication").

EXAMPLES

This invention will now be illustrated in more detail by the following Examples and Comparative Examples.

EXAMPLE 1

Preparation of hexagonal system Ba ferrite magnetic particles 1 mol of ferric chloride, 1/7 mole of barium chloride, 1/10 mol of cobalt chloride, 1/25 mol of titanium chloride and 1/10 mol of zinc chloride were dissolved in 1 liter of water, 923 g of an sodium hydroxide aqueous solution in which 5 mol of sodium hydroxide was dissolved in 1 liter of water was added thereto to neutralize it and 0.3 mole of $Na_2CO_3$ was also added. The solution was ripened for 3 days, and the resulting slurry of alkaline precipitates was put in an autoclave with a stirrer, heated to react at 350° C. and 16.5 MPa (pressure) for 6 hours, washed vigorously with water and dried, and then heated in air at 800° C. for 4 hours for calcination to obtain Ba ferrite magnetic particles. The thus obtained Ba ferrite particles were confirmed to be hexagonal system ferrite of magnetoplumbite by X-ray diffraction analysis. The thus obtained hexagonal system ferrite particles were used to prepare a magnetic recording medium.

Hexagonal system ferrite particles: 300 parts by weight

Specific surface area determined by BET method: 40 $(m^2/g)$

Saturation magnetization: 66 (emu/g)

Average particle diameter: 0.08 (μm)

Hc = 850 (Oe)

| Copolymer of vinyl chloride and vinyl acetate (9/1) | 30 parts by weight |
| --- | --- |

Lecithin: 1.2 parts by weight

Graphite particles: 6 parts by weight (particle size: 0.08 μm)

Chromium oxide $(Cr_2O_3)$: 30 parts by weight

Average particle diameter: 0.5 (μm)

Methyl ethyl ketone: 36 parts by weight

Toluene: 36 parts by weight

The above composition was mixed and kneaded for 60 minutes and the following composition was added thereto.

$SO_3Na$ group containing polyester polyurethane MW: 70,000: 20 parts by weight

Polar group: 150 $x/10^{-6}$ eq/grm

Methyl ethyl ketone: 250 parts by weight

15 Toluene: 250 parts by weight

The above composition was uniformly mixed and dispersed using a sand grinder, and the following composition was further added thereto, and mixed and dispersed using the sand grinder to prepare a hardenable magnetic coating composition.

Polyisocyanate: 25 parts by weight

Butyl stearate 4 parts by weight

Oleic acid 4 parts by weight

Toluene 270 parts by weight

The resulting magnetic coating composition was coated on both surfaces of a conventionally discharge treated polyethylene terephthalate film having a thickness of 75 μm in a dry thickness of 3 μm each using a gravure roll and was subjected to a calendering treatment to prepare a floppy disk.

EXAMPLE 2

By following the same procedure as in Example 1, a sample was prepared except that in the preparation of hexagonal system Ba ferrite particles in Example 1, the amounts of cobalt chloride and zinc chloride were changed to 1/15 mol each and heat treatment in air was carried out 850° C. for 3 hours. The characteristics of magnetic particles are shown below.

Hexagonal system ferrite magnetic particles

Specific surface area determined by BET method: 25 $(m^2/g)$

Saturation magnetization: 67 (emu/g)

Average particle diameter: 0.10 (μm)

Hc = 830 (Oe)

EXAMPLE 3

By following the same procedure as in Example 1, a sample was prepared except that in the preparation of hexagonal system Ba ferrite particles in Example 1 the amounts of cobalt chloride and zinc chloride were changed to 1/7 mol each, and heat treatment in air was carried out 750° C. for 4 hours. The characteristics of the thus obtained magnetic particles are shown below.

Hexagonal system ferrite magnetic particles

Specific surface area determined by BET method: 67 $m^2/g$

Saturation magnetization: 60 emu/g

Average particle diameter: 0.06 μm

HC = 880 Oe

COMPARATIVE EXAMPLE 1

By following the same procedure as in Example 1, a sample was prepared except that in the preparation hexagonal system Ba ferrite particles in Example 1, the amounts of titanium chloride and zinc chloride were changed to 1/10 mol and 1/25 mol, respectively, and heat treatment in air was done at 850° C. for 4 hours. The thus obtained magnetic particles have the following characteristics.

Hexagonal system ferrite magnetic particles

Specific surface area determined by BET method: 35 $m^2/g$

Saturation magnetization: 53 emu/g

Average particle diameter: 0.08 μm

Hc = 850 Oe

COMPARATIVE EXAMPLE 2

By following the same procedure as in Example 1, a sample was prepared except that the copolymer of vinyl chloride and vinyl acetate and the $SO_3Na$ group containing polyester polyurethane used as a binder in Example 1 were changed to the following composition.

Copolymer of vinyl chloride and vinyl acetate (degree of polymerization:450) 30 parts by weight.

Polyurethane ("Crisvon 7209" manufactured by DAI-NIPPON INK AND CHEMICALS, INC. 20 parts by weight.

3.5 inch floppy disks were made using the coating compositions of in Examples.1 to 3 and Comparative Examples 1 and 2, and were tested for running durability under 24 H thermocycle circumstances at 5° C. and 10% RH and at 50° C. and 30% RH (i.e., were tested for running durability under the condition in that the temperature changes between 5° C. and 50° C., the humidity changes between 10% and 30% in such a way that one cycle is 24 hours) using a floppy disk drive "FD-1135D" manufactured by Nippon Electric Co., Ltd. The results are shown in Table 1. The initial 2F output (track φ) is a relative value when Example 1 is assumed to have 100%).

TABLE 1

| Sample | Initial 2F reproduced output | Thermocycle running durability |
| --- | --- | --- |
| Example 1 | 100% | 25,000,000 passes, Good |
| Example 2 | 102% | 25,000,000 passes, Good |
| Example 3 | 96% | 25,000,000 passes, Good |
| Comparative Example 1 | 85% | 25,000,000 passes, Good |
| Comparative Example 2 | 101% | Wear occurred at 3,500,000 passes |

As is apparent from the results of Table 1, samples per Examples 1 to 3 exhibited better high reproduction output than that of Comparative Example 1. Samples per Examples 1 to 3 exhibited remarkably improved running durability as compared to Comparative Example 2.

Accordingly, excellent reproduced output and good running durability can be obtained and much higher density recording can be realized by a magnetic recording medium of this invention comprising a non-magnetic support having thereon a magnetic layer containing ferromagnetic particles which are a hexagonal system tabular particle, and which have an axis of easy magnetization in a direction perpendicular to the plate surface and are dispersed in a binder, wherein the ferromagnetic particles have a saturation magnetization of 60 emu/g or higher, a specific surface area (BET method) of form 25 to 70 m²/g, an average particle diameter of from 0.01 to 0.2 μm, and a force of from 400 to 2000 oersteds, the binder have at least one kind of polar group in an amount of $1 \times 10^{-5}$ eq/g or more.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer containing ferromagnetic particles which are hexagonal system tabular particles and which have an axis of easy magnetization in a direction perpendicular to the major axis of the plate and are dispersed in a binder, wherein said ferromagnetic particles have saturation magnetization of 60 emu/g or higher, a specific surface area (BET method) of from 25 to 70 m²/g. an average particle diameter of from 0.01 to 0.2 μm, and a coercive force of from 400 to 2000 oersteds, and said binder contains a resin having at least one kind of polar group in an amount of $1 \times 10^{-5}$ eq/g or more of the polar group, wherein said magnetic recording medium is a floppy disk in which thermocycle running durability is improved.

2. The magnetic recording medium as claimed in claim 1, wherein said ferromagnetic particles are co-substituted barium ferrite or a co-substituted strontium ferrite.

3. The magnetic recording medium is claimed in claim 1, wherein said ferromagnetic particles have an average particle diameter of from about 0.03 to 0.10 μm, an average particle thickness of from about 0.001 to 0.5 μm and the coercive force of from 500 to 1500 oersteds.

4. The magnetic recording medium as claimed in claim 1, wherein said ferromagnetic particles have the saturation magnetization of from 60 to 80 emu/g, the specific surface area of from 25 to 50 m²/g and the coercive force of from 500 to 1500 oersteds.

5. The magnetic recording medium as claimed in claim 1, wherein said resin has a content of the polar group of from $1 \times 10^{-5}$ to $1 \times 10^{-3}$ eg/g.

6. The magnetic recording medium as claimed in claim 1, wherein said binder contains the resin having the polar group in an amount of 5 wt % or higher.

7. The magnetic recording medium as claimed in claim 1, wherein a mixing ratio of said ferromagnetic particle said binder is from 10 to 50 part by weight of binder per 100 parts by weight of the ferromagnetic particles.

* * * * *